United States Patent [19]

Hudson et al.

[11] Patent Number: 4,673,363
[45] Date of Patent: Jun. 16, 1987

[54] MARINE MEASUREMENT DEVICE

[75] Inventors: Alan T. Hudson, Mattapoisett; David P. Gagnon, East Sandwich; David W. Johns, II, Marion; William J. Langenhein, Jr., S. Dennis, all of Mass.

[73] Assignee: Sippican Ocean Systems, Inc., Marion, Mass.

[21] Appl. No.: 797,175

[22] Filed: Nov. 8, 1985

Related U.S. Application Data

[63] Continuation of Ser. No. 504,571, Jun. 15, 1983, abandoned.

[51] Int. Cl.[4] .................. B63B 22/00; B63B 22/20; B63B 22/26
[52] U.S. Cl. ........................ 441/1; 264/516; 361/399; 441/22; 441/23; 441/33
[58] Field of Search ............ 441/1, 11, 22, 23, 32, 441/33; 361/395, 399; 367/3, 4; 264/516, 523, 540

[56] References Cited

U.S. PATENT DOCUMENTS

| 2,310,017 | 2/1943 | Canon et al. | 250/17 |
|---|---|---|---|
| 2,395,252 | 2/1946 | Carpenter | 441/33 |
| 2,562,922 | 8/1951 | Kist | 9/9 |
| 3,071,788 | 1/1963 | Nelson | 9/8.3 |
| 3,229,311 | 1/1966 | Maes | 441/11 |
| 3,248,688 | 4/1966 | Shomphe | 340/2 |
| 3,253,810 | 5/1966 | Penn | 244/138 |
| 3,283,348 | 11/1966 | Farmer et al. | 9/8 |
| 3,363,282 | 1/1968 | Hagen | 264/540 |
| 3,419,927 | 1/1969 | Stoffer et al. | 9/9 |
| 3,424,623 | 1/1969 | Oakley et al. | 264/523 X |
| 3,705,931 | 12/1972 | Confer et al. | 264/516 X |
| 3,800,271 | 3/1974 | Stillman | 340/2 |
| 3,905,060 | 9/1975 | Higgs | 9/9 |
| 4,209,151 | 6/1980 | Saunders | 224/138 |
| 4,357,688 | 11/1982 | Dale et al. | 367/4 |

OTHER PUBLICATIONS 0 023 867, Suppa et al., Europeau Patent Office, Feb. 1981.

Primary Examiner—Sherman D. Basinger

[57] ABSTRACT

A sonobuoy having a terminal weight and sensor for deployment beneath the surface of the water after the buoy has been launched from an aircraft and impacted the water. A circuit assembly and antenna for processing output from the sensor and for transmitting a signal is provided. A cable for connecting the sensor and circuit assembly is also included. A housing for the sonobuoy is a blow molded seamless thermoplastic shell which surrounds the circuit assembly.

29 Claims, 12 Drawing Figures

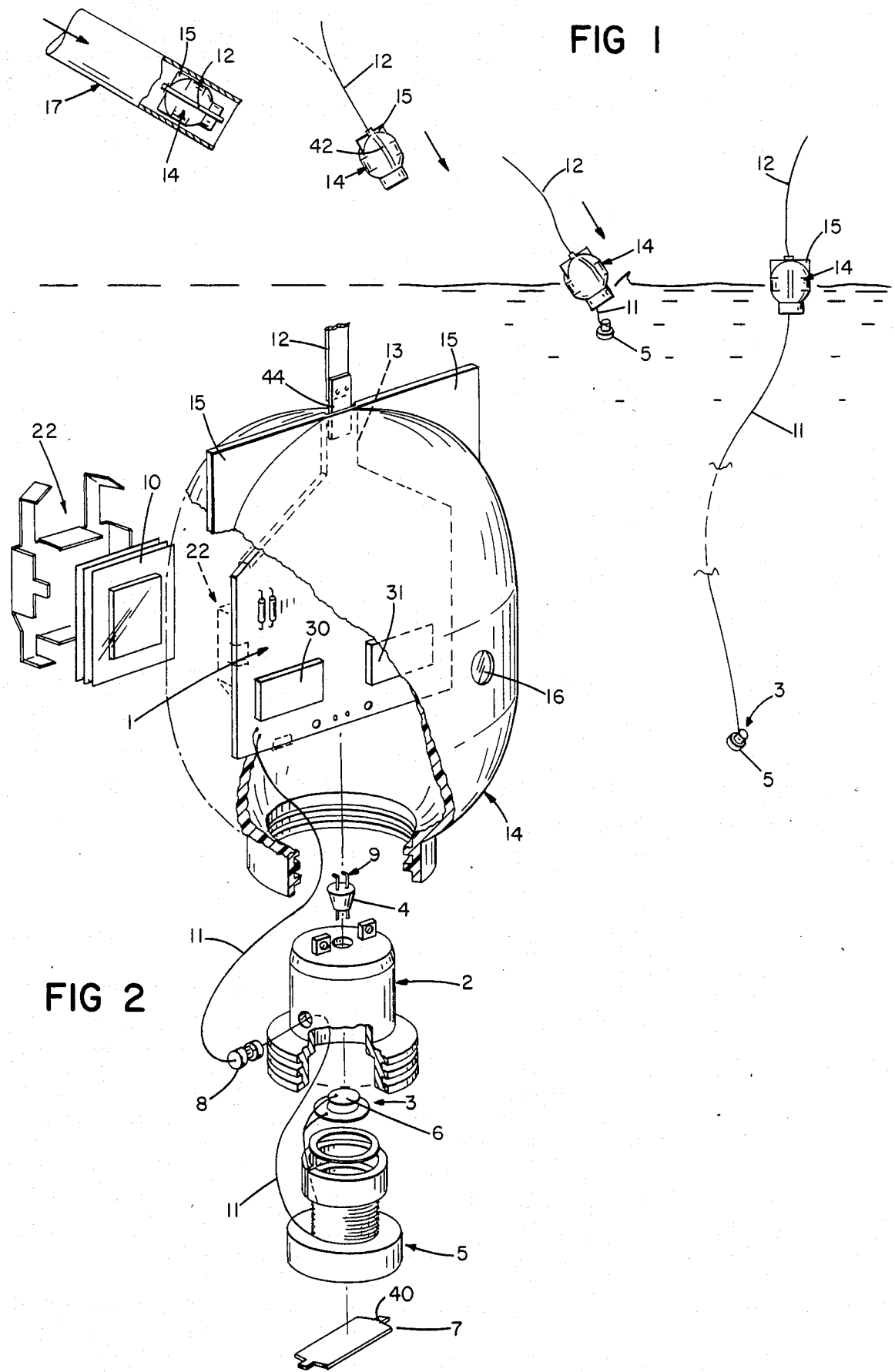

MARINE MEASUREMENT DEVICE

This is a continuation of application Ser. No. 504,571, filed June 15, 1983, now abandoned.

BACKGROUND OF THE INVENTION

This invention relates to sensor buoys such as sonobuoys. Such buoys are typically launched from aircraft, and a sensor, carried within the buoy until water impact, is deployed beneath the water surface. Signals from the sensor are transmitted to the surface, and typically back to the aircraft, by an underwater cable and floating transmitter. A common use for such buoys is detection of submarines, in which case the sensor is an acoustic device.

SUMMARY OF THE INVENTION

In general the invention features, in a first aspect, a blow-molded housing surrounding the circuit assembly of a sensor buoy such as a sonobuoy. In preferred embodiments, the blow-molded housing forms a seamless, watertight flotation compartment for the circuit assembly, a terminal weight and sensor (e.g., hydrophone) are contained within a ballast cup at the base of the housing and are deployed upon water impact; the blow-molded housing is molded tightly around the exterior of the ballast cup to provide a water tight seal, even during water impact; the circuit assembly consists of a vertically-oriented circuit board supported on the ballast cup; an air space separates the board from the housing (to provide insulation from the heat of the blow molding process); an antenna is supported on a tab extending through the blow molded housing at its top; water cooling is supplied to the molds used in the blow molding process to reduce the temperature elevation of the electronic components; annular grooves are provided on the exterior of the ballast cup for improving the water tightness of the seal to the blow molded housing; and aerodynamic fins are molded into the top of the housing for aerodynamic orientation.

In a second aspect, the invention features an antenna attached to the buoy housing and adapted to be deployed during the free-fall of the buoy, prior to its water impact. In preferred embodiments, the antenna is wrapped around the housing; the housing includes a shallow groove for receiving the wrapped-around antenna; the antenna is a blade of greater width than thickness; and the antenna is adapted to provide aerodynamic drag and stability during the buoy's fall.

In a third aspect, the invention features a water-impact-actuated release means comprising a plate extending across the bottom opening of the ballast cup and adapted to release the terminal weight and sensor upon water impact but not upon high inertial loading. In preferred embodiments, a weakened region is provided near one tab and the terminal weight is spaced from the plate in the vicinity of that tab so that inertial loading on the weight is resisted by unweakened regions of the plate and so that space is provided between the plate and the weight in the vicinity of the weakened region to enable the water impact force to push the plate inward and thereby break the plate at the weakened region.

In a fourth aspect, the invention features an extended spheroid housing, i.e., one having a cylindrical mid section and semispherical end portions. In preferred embodiments, the antenna is connected to the top semispherical portion; the bottom semispherical portion has a flat surface generally at its center for causing the buoy to dig into the water upon water impact rather than to skip along the surface.

The inventions have numerous advantages. They provide a simpler and less costly buoy, and one that can safely be allowed to fall freely (without a parachute or similar drag device) to the water surface. Forming the housing by blow molding creates a seamless structure with no high stress points; it avoids the problem that two-piece construction housings have of fracturing upon impact and eliminates the need for reinforcement bands, which complicate the manufacturing process and add to the weight of the sonobuoy; and surprisingly the blow-molding process, even though an extremely hot process, does not harm the temperature sensitive electronic components and, furthermore, provides an excellent seal around the ballast cup, one that withstands water impact. Because the antenna is released at launching, it provides additional drag and stability during free flight to ensure that the buoy impacts the water at the desired velocity and in a nose down orientation so that the shear plate will break; launch release also eliminates the need for an antenna release mechanism at impact, which complicates the buoy's manufacture and increases its weight. The extended spheroid shape of the buoy housing also has advantages; it provides a high center of buoyancy and low center of gravity to reduce the sonobuoy's rolling motion and provide a more stable platform for transmission of the alarm signal, it provides high drag and stability during free fall, it has good impact strength, and the preferred flattened bottom prevents the buoy from skipping across the water at initial impact.

Other advantages and features of the invention will be apparent from the following description of a preferred embodiment.

DESCRIPTION OF THE PREFERRED EMBODIMENT

The structure and use of a preferred embodiment of the invention will now be described, after first briefly describing the drawings.

DRAWINGS

FIG. 1 is a group of four diagrammatic views of the deployment of said embodiment into the water.

FIG. 2 is an exploded perspective view of said embodiment.

STRUCTURE

Figure 3:
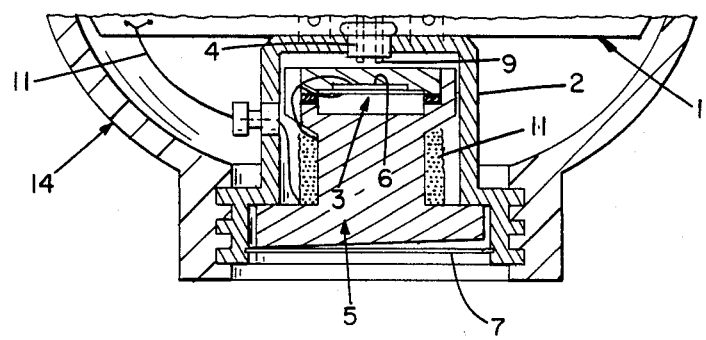
FIG. 3 is a sectional view of the ballast cup and hydrophone/terminal weight assembly.

Referring to FIGS. 1 and 2, there is shown a sonobuoy consisting of a printed circuit board 1, ballast cup 2, omni-directional hydrophone 3, terminal weight 5, shear plate 7, battery pack 10, transmitting antenna 12, and polyethylene buoy housing 14. Mounted to the printed circuit board is a conventional transmitter, microprocessor chip 31 (TMS 1000, Texas Instruments), integrated circuit 30, and associated discrete components. Three flat pack batteries (6 Volt Polaroid P-80 Polapulse) are contained in case 22 that snaps onto the printed circuit board. Antenna tab 13 is riveted to the top of the board. The board is riveted at the bottom to the ballast cup. At the same time, rubber plug 4 attached to the bottom of the board is inserted through a hole in the top surface of the ballast cup. This rubber plug acts as a seal when the buoy is in the water. Also, the plug houses two salt water electrodes 9 that are connected to the circuit board and that protrude from the plug's bottom.

The hydrophone consists of a flexural transducer, which is a small thin piezoelectric ceramic disc 6 mounted on a brass plate. The ceramic disc surface is silvered and an electrode is soldered to this surface. Another electrode is soldered to the brass ring. One end of each of two conductors in cable 11 is connected to each electrode. The transducer is placed on a plastic ring which is cemented into the zinc terminal weight and then potted over. The plastic ring and potting serve to protect and isolate the connections.

Figure 4:
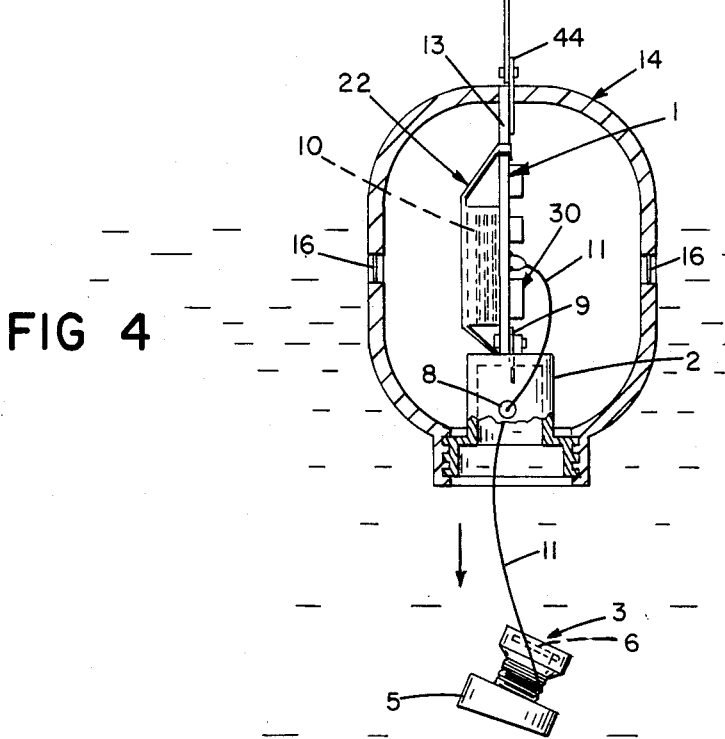
FIG. 4 is a sectional view taken along 4—4 of FIG. 3 showing the sonobuoy after the shear plate has broken.

Around the outside of the terminal weight is wound at least 300 feet of three-strand cable. Two strands are conductors for carrying the output signal of the hydrophone. The third strand is Kevlar (Dupont), a high strength-to-weight ratio polymer. Only a very thin (200 Denier) strand of Kevlar is needed, thus reducing the cross section of the cable and thus its drag in the water. The cable at the outside end of the spool is fed through rubber grommet 8 that fits into a hole in the ballast cup and the two wires contained in the cable are connected to the circuit board. The terminal weight/hydrophone assembly is placed inside the ballast cup, and shear plate 7, with its two retaining tabs, is inserted into grooves on the inside of the ballast cup. As shown in FIG. 3, the left retaining tab of the shear plate supports the terminal weight and will prevent the terminal weight from prematurely falling out of the ballast cup due to inertial forces during handling before deployment. The right retaining tab is scored at 40 (FIGS. 2 and 4) and is spaced below the terminal weight as a result of the tapered shape of the bottom of the weight. The spacing between the plate and the weight in the vicinity of the weakened (scored) region allows the plate to be pushed inward at water impact, thus tearing or rupturing the plate. On the other hand, the space prevents inertial loads on the weight from being applied to the weakened region, thus assuring that the plate will not accidentally rupture during handling.

Figure 6D:
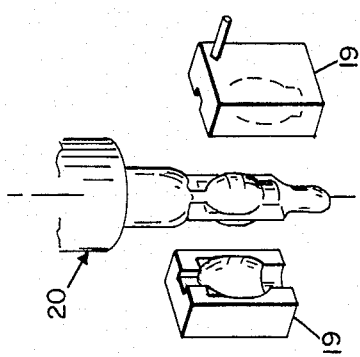
FIGS. 6a–6g are perspective views of steps in the manufacture of said embodiment.
Figure 6C:
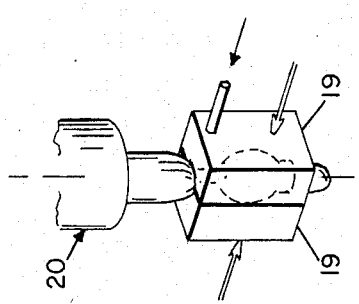
Figure 6B:
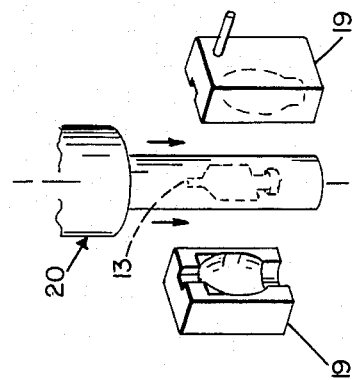
Figure 6A:
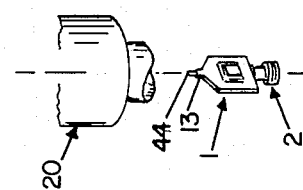
Figure 6G:
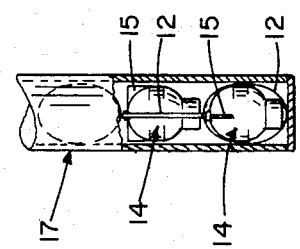
Figure 6F:
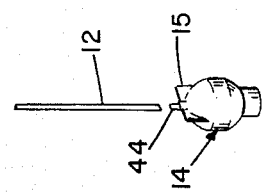
Figure 6E:
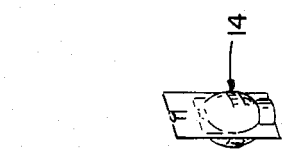

To form the buoy housing, the printed circuit board and ballast cup assembly are placed (FIG. 6a) on a support stand (not shown). While the two halves of housing mold 19 are spaced apart, extruder 20 extrudes a tube of high density polyethylene around the electronics and ballast/hydrophone assembly (FIG. 6b). The thickness of the tube varies from 0.100 inches at the bottom to 0.075 inches at the top. Next, the two halves of the mold are pressed together (FIG. 6c), compressively molding the polyethylene around the base of the ballast cup and around tab 13 at the top of the printed circuit board. A needle 21 is now inserted into the pinched off tube and high pressure air is blown into the tube, forcing the tube to assume the shape of the inside of the mold. This blow molding operation is a hot process. To keep the maximum temperature to which the components on the circuit boards are exposed below their maximum temperature of 185°, the molding is done quickly and the molds themselves are water cooled. The result of the blow molding operation is a one piece seamless housing with no structural weak points. The housing is trimmed (FIGS. 6d–6f), leaving an extended spheroid (cylindrical middle section with semispherical upper and lower ends) and two stabilizing fins 15. Two scuttle plugs 16 (FIG. 2), made of Polyox (DuPont), a water soluble plastic, are pressed into holes formed after molding in the midsection of the housing. Steel antenna 12 is then riveted (FIG. 6f) to tab 44 which is made from the same antenna material and which extends from the circuit board 1. (The full antenna is not installed prior to molding to reduce the length of extruded polyethylene required.) A shallow groove 42 (FIG. 1) is formed during molding completely around the outside of the housing to form a receptacle for the steel antenna when it is wrapped around the housing and inserted in launching cylinder 17 (FIG. 6g).

Figure 5:
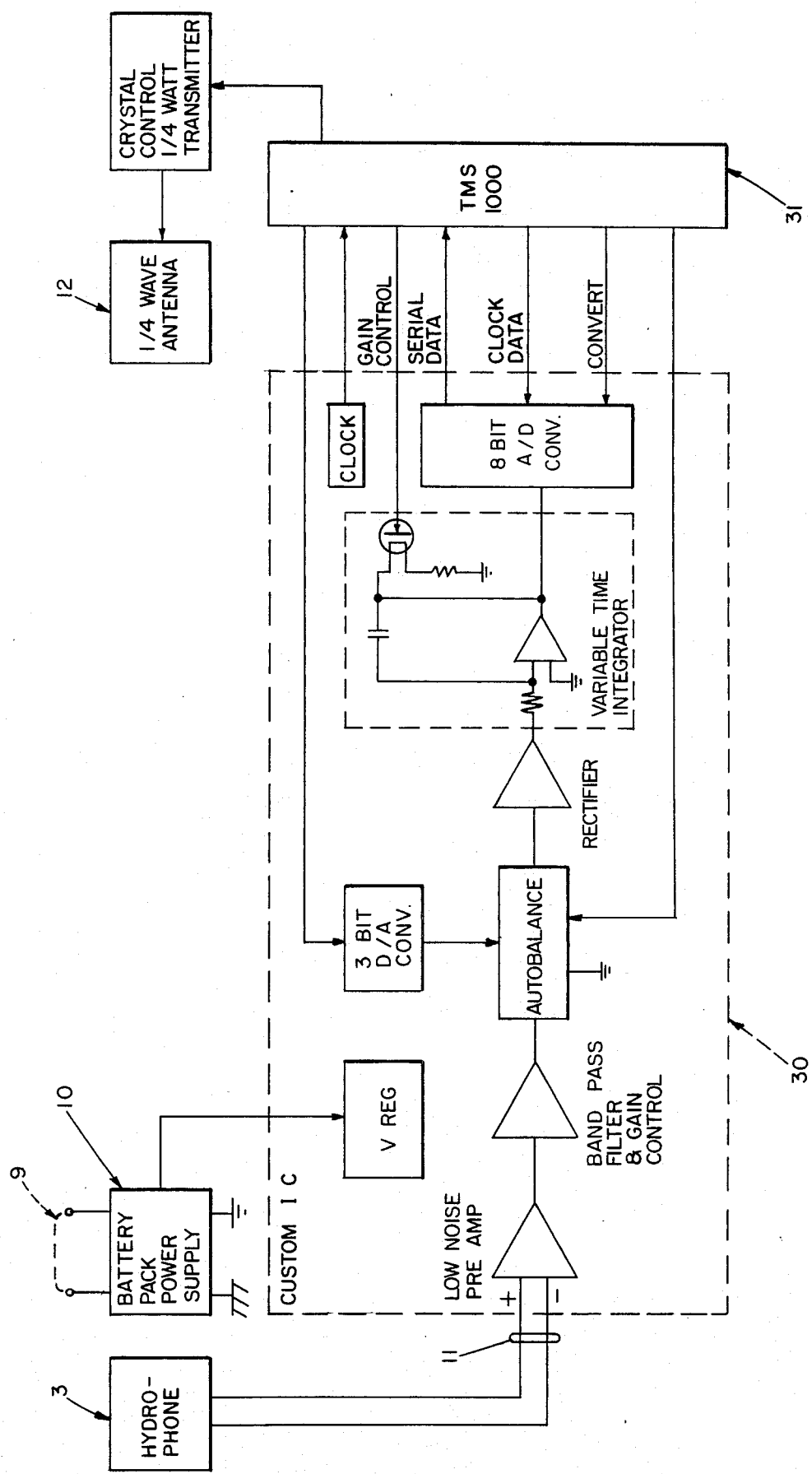
FIG. 5 is a block diagram of the signal processor of said embodiment.

The components of the signal processor, which controls the detection operation of the sonobuoy, are shown in FIG. 5. The hydrophone signal is preamplified, and then filtered and amplified to leave only the signal and noise in the frequency band of interest. Any DC bias is subtracted out through the use of a microprocessor-controlled autobalance circuit and the resulting AC signal is rectified.

When the amplitude of the AC signal at the analog-to-digital converter input is greater than a threshold voltage stored in the microprocessor, the latter will modulate the transmitter via the alarm output, and the transmitter will send out this signal via the antenna. This will continue for as long as the target is present, or 15 minutes, the life of the batteries. If the transmitter is never used, the batteries will operate the rest of the circuitry for about four hours.

The buoy is 4.5 inches in diameter, 5.6 inches in height, and 1.4 lb in weight. Its center of gravity is 1.7 inches from its base, and its center of buoyancy is 1.95 inches from its base. The antenna is 18 inches long and 0.5 inches wide.

OPERATION

The sonobuoys are deployed as shown in FIG. 1. One buoy at a time is launched from a cylinder (each of which contains six buoys) carried by an aircraft. Antenna 12 springs back to its relaxed position upon the sonobuoy's exit from the cylinder, and the antenna acts as a tail to provide, along with the fins, drag and stability for the sonobuoy as it falls freely to the water. The fins are particularly helpful to initially orienting the buoy immediately after launch. Upon impact, the scored right retaining tab 40 of the shear plate 7 (FIG. 3) will break. This releases the hydrophone/terminal weight assembly from the ballast cup, allowing the assembly to fall down into the water until the spool of cable completely unwinds. The release of the assembly will also expose the salt water electrodes to the salt water, completing a circuit that turns on the power supply. The signal processor initializes the system by setting the initial gain of the integrator and the initial threshold level. The sonobuoy is now ready for its normal mode of operation.

In its normal mode of operation, the sonobuoy listens for submarines by measuring the ambient noise detected by the hydrophone across a frequency range. When the detected noise rises above a stored threshold level, the transmitter sends out an alarm signal as long as the target is present or until the battery power runs out. If no submarine is detected, the transmitter is silent. The scuttle plugs will erode after about eight hours, and the sonobuoy will sink.

Other embodiments of the invention are within the scope of the following claims. For example, the blow molding process could be used to enclose other types of circuit assemblies than those of a sonobuoy.

What is claimed is:

1. A sensor buoy such as a sonobuoy, said buoy comprising
   a terminal weight and sensor for deployment beneath the surface of the water after said buoy impacts the water,
   a circuit assembly and antenna for processing the output of said sensor and transmitting a signal,
   a cable for connecting said sensor to said circuit assembly, and a housing, said housing comprising a blow molded seamless thermoplastic shell, said housing surrounding said circuit assembly.

2. The buoy of claim 1 wherein said blow molded thermoplastic shell forms a water-tight flotation compartment for supporting said circuit assembly and antenna on the surface of the water.

3. The buoy of claim 2 wherein said housing contains said terminal weight and sensor prior to their deployment.

4. The buoy of claim 3 wherein said housing comprises a ballast cup at its base, said blow-molded shell being molded around the exterior of said ballast cup and said terminal weight and sensor being stowed within said ballast cup prior to their deployment.

5. The buoy of claim 4 wherein said circuit assembly includes at least one circuit board supported on said ballast cup and completely surrounded by said blow-molded shell.

6. The buoy of claim 5 wherein said circuit board is generally vertically oriented when said sonobuoy is floating upright and is separated from said shell by an air space.

7. The buoy of claim 5 comprising a tab extending from said circuit board through said blow-molded shell, said shell being molded around said tab, and said antenna being connected to the portion of said tab extending outside of said shell.

8. The buoy of claim 4 wherein said blow-molded shell has a cylindrical middle section and upper and lower semispherical end portions.

9. The buoy of claim 8 wherein two aerodynamic fins are molded into said upper semispherical end portion for orienting the buoy when deployed from an aircraft.

10. The buoy of claim 8 wherein said antenna is a blade extending from the top of said blow-molded shell and is adapted to be deployed during the buoy's fall to provide aerodynamic drag and stability.

11. The buoy of claim 4 wherein said buoy is adapted to be ejected from an airplane and to fall to the water without a parachute or other drag device and wherein there is provided a water-impact-actuated release means for deploying said terminal weight and sensor.

12. The buoy of claim 11 wherein said release means comprises a plate extending across the bottom opening of said ballast cup and adapted to rupture upon water impact.

13. The subject matter of claim 1 wherein said buoy is a sonobuoy, said sensor is a hydrophone, and said circuit assembly includes means for detecting the presence of a submarine from the output of said hydrophone and means for transmitting an alarm to a remote receiver.

14. The buoy of claim 1 wherein said circuit assembly inside said blow-molded housing comprises all the electronic circuitry of said buoy.

15. The method of fabricating a sensor buoy such as a sonobuoy, comprising the steps of
   installing a circuit assembly on a ballast cup or other base,
   extruding a tube of molten thermoplastic material fully around said circuit assembly and base,
   molding said tube between sections of a mold and injecting high pressure gas into the interior of said material so as to blow mold a thermoplastic shell around said circuit assembly and base.

16. The method of claim 15 wherein said mold sections are cooled and said extruding and molding steps are performed rapidly enough not to damage electronic components of said circuit assembly.

17. The method of claim 15 wherein said ballast cup has an opening at its bottom for receiving a terminal weight and sensor and said opening is not covered by said thermoplastic shell.

18. The method of claim 15 wherein said thermoplastic material is molded tightly around an exterior surface of said base to form a water-tight seal capable of withstanding water impact after free fall without leaking.

19. The method of claim 18 wherein said exterior surface is provided with annular grooves which fill with said thermoplastic material.

20. The buoy of claim 15 wherein said circuit assembly includes at least one circuit board supported on said ballast cup and completely surrounded by said blow-molded shell.

21. The buoy of claim 15 wherein said circuit assembly includes at least one circuit board supported on said ballast cup and completely surrounded by said blow-molded shell, wherein there is a tab extending from said circuit board through said blow-molded shell, said shell being molded around said tab, and wherein said method comprises the further step of securing an antenna to said tab after molding is completed.

22. The subject matter of claim 15 wherein said buoy is a sonobuoy, said sensor is a hydrophone, and said circuit assembly includes means for detecting the presence of a submarine from the output of said hydrophone and means for transmitting an alarm to a remote receiver.

23. A sensor buoy such as a sonobuoy, said buoy comprising
   a housing for being ejected from an aircraft and falling freely without the assistance of a parachute to the water surface,
   an electronic circuit assembly contained within said housing, said circuit assembly including a transmitter, and
   an antenna attached to said housing and connected to said transmitter,
   said antenna extending from said housing and with means for being deployed during the fall of said buoy,
   wherein means are provided for stowing said antenna prior to ejection by wrapping the antenna around the exterior of said housing, and
   wherein said antenna is a narrow projection, narrower in width than said housing, and provides aerodynamic stability during the fall of said buoy, by maintaining the buoy in an orientation in which the antenna extends rearwardly, in a direction opposite that of the buoy's falling motion.

24. The buoy of claim 23 wherein said antenna is a blade with a width much greater than its thickness.

25. The buoy of claim 24 wherein said housing includes a groove around its exterior for receiving said blade antenna when said antenna is wrapped therearound prior to ejection.

26. The subject matter of claim 23 wherein said buoy is a sonobuoy, said sensor is a hydrophone, and said circuit assembly includes means for detecting the presence of a submarine from the output of said hydrophone and means for transmitting an alarm to a remote receiver.

27. The method of fabricating an electronic circuit assembly and surrounding housing, said method comprising the steps of installing high-temeprature-intolerant electronic components on a circuit board, said components including semiconductor components having a maximum exposure temperature, extruding a tube of molten thermoplastic material fully around said circuit board and components, the temperature of said molten material exceeding said maximum exposure temperature, molding said tube between sections of a mold and injecting high pressure gas so as to blow mold a thermoplastic shell around said circuit board, completing said extruding and molding steps quickly enough to prevent said semiconductor components from being heated to said maximum exposure temperature.

28. The method of claim 27 wherein said housing and circuit board comprises a portion of a sonobuoy and said housing forms a watertight flotation compartment of said sonobuoy.

29. The method of fabricating a sensor buoy such as a sonobuoy, said method comprising the steps of supporting at least the circuit assembly of said buoy in a blow-molding apparatus, extruding a tube of molten thermoplastic material fully around said circuit assembly, molding said tube between sections of a mold and injecting high pressure gas so to blow mold a seamless, thermoplastic shell around said circuit assembly, and assembling an antenna, a terminal weight, an underwater sensor, and underwater cable of said buoy, some or all of which may be included with said circuit assembly within said blow molded housing.

* * * * *